Oct. 27, 1970    J. P. RODRIGUEZ    3,536,294
FOOT-OPERATED CONTROL VALVE ATTACHMENT DEVICE FOR WATER FAUCETS
Filed Oct. 15, 1968

INVENTOR.
JOSE PELAEZ RODRIGUEZ
BY Ernest H Schmidt
ATTORNEY.

United States Patent Office 3,536,294
Patented Oct. 27, 1970

3,536,294
FOOT-OPERATED CONTROL VALVE ATTACHMENT DEVICE FOR WATER FAUCETS
Jose Pelaez Rodriguez, 650 NE. 61st St.,
Miami, Fla. 33137
Filed Oct. 15, 1968, Ser. No. 767,703
Int. Cl. F16k 7/17, 31/385
U.S. Cl. 251—41                          4 Claims

ABSTRACT OF THE DISCLOSURE

A control valve member attachable to the spout of a faucet for the control of water flowing therethrough by means of a foot-operated control member connected by a flexible conduit to the control valve member and communicating with an upper chamber therein separated by a flexible diaphragm from an annular chamber surrounding a discharge tube and providing, at its upper end, an annular valve seat under the diaphragm, the annular chamber communicating with the discharge tube for the discharge of water therethrough when the diaphragm is unseated, and the upper chamber communicating through a bleeder opening to water under pressure in the faucet spout to which the control valve member is connected, the foot-operated control member being operable as a relief valve to discharge water through the conduit and thereby relieve the water pressure in the upper chamber for unseating the diaphragm and thereby discharging water through the discharge tube.

---

My invention relates to fluid flow control devices and is directed particularly to a foot-operated remote control valve for attachment to sink faucets or the like.

Foot-operated valves are in common use in medical and industrial sink installations where the hands must be free while the volume of water flow is controlled. Because such foot-operated valves as have heretofore been devised are complicated and expensive, however, they have been used only infrequently in residual plumbing installations. Nevertheless, foot-operated valves in bathroom sinks, particularly for use while shaving, and in kitchen sinks for use while washing dishes, cleaning vegetables and the like not only could facilitate such operations but also could effect considerable savings through the comparatively economical use of hot and cold water.

It is, accordingly, the principal object of this invention to provide a foot-operated control valve attachment device for water faucets that will be inexpensive enough for home use and which can readily be installed by the user.

Another object is to provide a foot-operated control valve attachment device comprising an attachment member and a foot-operated control member connected with the attachment member by a flexible conduit and adapted to be placed on the floor under the sink or other faucet installation to be controlled, the attachment device being readily adaptable for attachment to a wide variety of faucet spouts or the like, the flow of water or other fluid through which is to be controlled.

A more particular object is to provide a foot-operated control valve of the above nature wherein the attachment member comprises inlet and outlet ports, the outlet port being tubular in form and providing at its upper end an annular valve seat, a flexible circular diaphragm concentrically arranged above the valve seat and normally seated thereagainst for sealing off the flow of water through the outlet port, a cylindrical chamber above the diaphragm subjected to water under pressure through a bleeder opening communicating with the inlet port, an annular chamber beneath the diaphragm surrounding the tubular outlet port and communicating with the inlet port, and wherein the foot-operated control member comprises a normally-closed valve communicating through a flexible conduit with the cylindrical chamber and arranged and adapted to be operated by the application of foot pressure for the controlled relief of pressure in the chamber above the diaphragm.

Other objects, features and advantages of the invention will be apparent from the following description when read with reference to the accompanying drawings. In the drawings, wherein like reference numerals denote corresponding parts throughout the several views.

Figure 1:
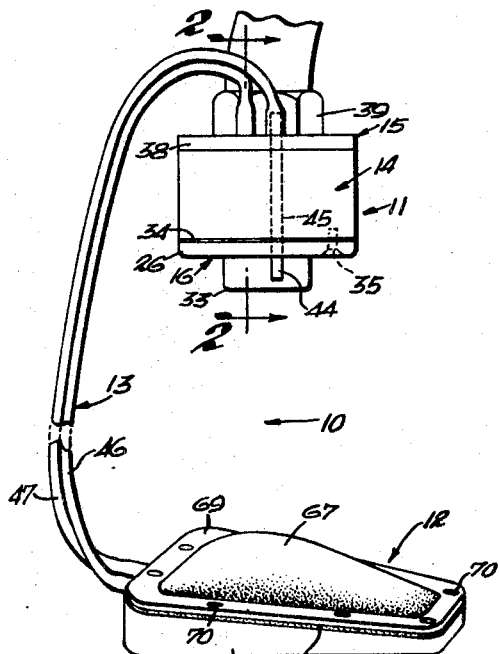
FIG. 1 illustrates, partly in perspective and with a portion of the flexible conduit broken away, a foot-operated control valve attachment for water faucets embodying the invention.

Referring now in detail to the drawings, 10 designates, generally, a foot-operated control valve attachment device embodying the invention, the same comprising a faucet attachment 11, a foot-operated control member 12, and an inter-connecting flexible conduit 13. The faucet attachment member 11, which may be formed of metal or a suitable synthetic plastic, for example, comprises a cylindrical body member 14, an upper end cap member 15, and a lower end cap member 16. The cylindrical body member 14 is provided in its upper end with a shallow bore or recess 17, defining a co-axial, circular recessed upper end wall 18. A first cylindrical bore 19, extending co-axially from the underside of the cylindrical body member 14 to terminate short of the shallow bore 17, defines, with said shallow bore, a circular horizontal wall or partition 20. A second cylindrical bore 21 of somewhat greater diameter than the first cylindrical bore 19 and co-axially formed in the lower end of the cylindrical body member 14, defines, with said first bore, an annular seat 22 against which is clamped a peripheral marginal portion of a flexible diaphragm 23, as is hereinbelow more particularly described.

The cylindrical body member 14 is drilled or otherwise provided with a plurality of bores or openings 24 extending axially from the recessed upper end wall 18 thereof at positions radially outward of the first and second cylindrical bores 19 and 21 to communicate at their lower ends with an annular, interior groove 25 formed in the lower end of said cylindrical body member and in communication with the second cylindrical bore 21.

Figure 2:
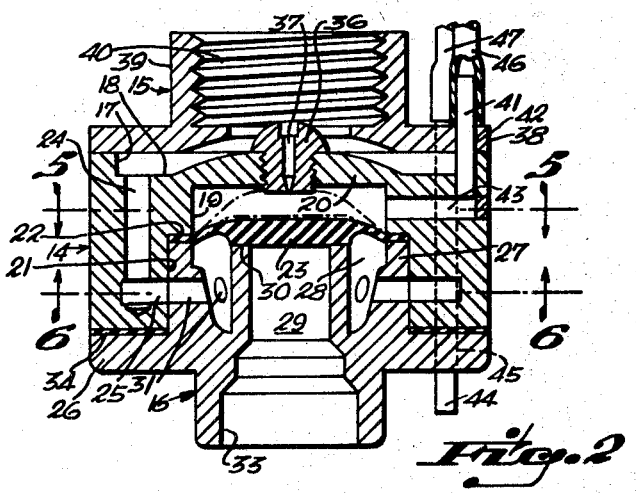
FIG. 2 is a vertical cross-sectional view of the faucet attachment member, shown separately and on enlarged scale.

The lower end cap member 16 is formed with a central annular flange the outer diameter of which is preferably the same as that of the cylindrical body member 14, and a cylindrical, upwardly-extending, co-axial portion 27 the outer diameter of which is such as to be received snugly within the second cylindrical bore 21 of said cylindrical body member. The cylindrical, upwardly-extending portion of the lower end cap member 16 is formed with a deep annular recess 28 and a central axial bore 29 which, together, define an annular valve seat 30. The outer wall of the upwardly-extending portion 27 is provided with a plurality of peripherally-spaced, radially-extending, through openings 31 so positioned that when the lower end cap member is assembled to the cylindrical body member 14, said through openings will be in communication with the annular groove 25. The lower end cap member 16 is also formed with a co-axially downwardly-extending tubular spout portion 33 in communication with the central bore 29 for the discharge of water under the control of the attachment device, as hereinbelow described. A thin annular gasket 34 prevents leakage upon assembly of the lower end cap member 16 to the cylindrical body member 14, as shown in FIGS. 1 and 2, as by machine screws 35. As illustrated in FIG. 2 it will be seen that the cylindrical, upwardly-extending portion 27 of the lower end cap member 16 is of such length that when said lower cap member is assembled to the cylindrical body member 14, the outer annular wall thereof will clamp the peripheral marginal zone of the diaphragm in place against the annular seat 22 of said body member. In such clamped position, the flat undersurface of the flexible diaphragm 23 will normally be held in seating engagement upon the annular valve seat 30.

As a means for supplying water under presure within the chamber above the diaphragm 23 and defined by the first cylindrical bore 19 and the horizontal partition 20, said partition is centrally drilled and tapped to receive a machine screw 36 having a small diameter, axially-extending bleeder opening 37.

The upper end cap member 15 is formed with an annular flange portion 38, which is preferably of the same outer diameter as that of the cylindrical body member 14, and a reduced-diameter, upstanding hexagonal nut portion 39 formed with internal threads 40 of such size as to be threadingly received upon the externally-threaded spout of an ordinary faucet. It is to be understood that instead of threads 40, some other connection means suitable to the faucet to be attached to, could alternatively be used, such as a resilient or adjustable friction-fit sleeve for use on faucet spouts.

As a means for relieving the pressure of water within the above-described chamber above the diaphragm 23, a short, small-diameter tube 41 is fitted and sealed, as by soldering, in a drilled opening or bore 42 extending axially through the annular flange portion 38 of the upper end cap member 15 and partially through an outer end wall portion of the cylindrical body member 14 in the axial direction to terminate in horizontal alignment with the pressure chamber above the diaphragm 23 and in communication with said chamber through a horizontally-extending bore 43 in said cylindrical body member. As illustrated in FIG. 1, a water relief tube 44 extends completely through bore 45 in the attachment member 11 in spaced parallel relation to the tube 41, for the purpose hereinafter appearing, said relief tube being fixed with respect to the annular flange portion 38 of the upper end cap member 15, as by soldering, and extending at its lower end through an appropriate opening in the annular flange portion 26 of the lower end cap member 16 to permit assembly of said lower end cap member to the cylindrical body member 14 as hereinabove described. As illustrated in FIGS. 1 and 2, the tubes 41 and 44 project somewhat above the upper surface of the flange portion 38 of the upper end cap member 15 for fitting thereover and coupling therewith the upper ends of flexible tubes 46 and 47, respectively, which comprise the flexible conduit 13.

Figure 3:
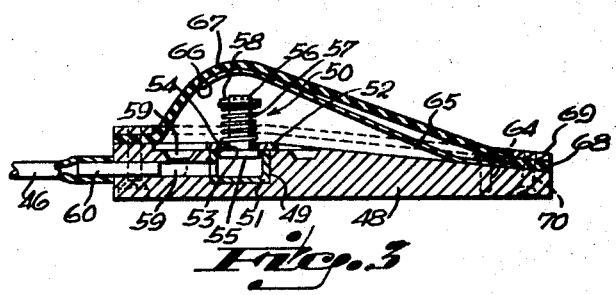
FIG. 3 is a vertical, longitudinally-extending cross-sectional view of the foot-operated control member, shown separately.
Figure 5:
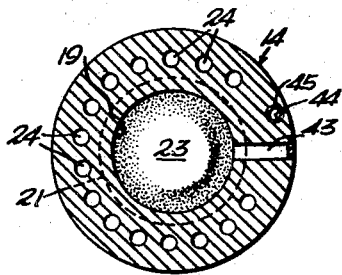
FIG. 5 is a horizontal cross-sectional view, taken along line 5—5 of FIG. 2 in the direction of the arrows.
Figure 4:
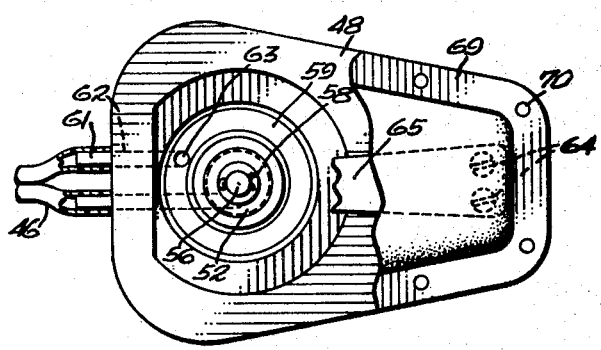
FIG. 4 is a top view, with portions broken away, of the foot-operated control member.
Figure 6:
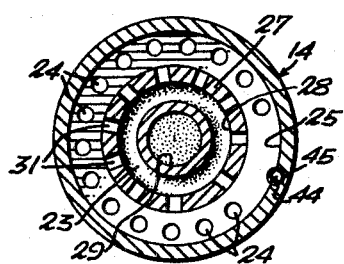
FIG. 6 is a horizontal cross-sectional view of the faucet attachment member, taken along the line 6—6 of FIG. 2 in the direction of the arrows.

The foot-operated control member 12 comprises a base plate 48, which may be trapezoidal in shape, for example, and formed of metal or a synthetic plastic. As illustrated in FIGS. 3 and 4, the base plate 48, near the back or wide portion thereof and centrally located in the lateral direction, is provided with a vertically-extending recess or bore 49 for the reception of a relief valve member 50, said relief valve having a tubular skirt portion 51 press-fitted or otherwise secured in said bore. The relief valve 50 is formed with an upper end wall portion 52 having a central, circular opening 53 defining, at its underside, an annular valve seat 54. Normally seated against the valve seat 54 is the annular underside of the head portion 55 of a relief valve shank member 56 extending upwardly loosely through the central opening 53. A helical compression spring 57, surrounding the valve shank 56 and constrained between the upper surface of the machine screws 35. As illustrated in FIG. 2 upper end wall portion 52 and a cotter pin 58, normally urges the head portion 55 in seating engagement with respect to valve seat 54, thereby normally preventing the flow of water under pressure through the bore 59 into the chamber surrounding the upper end of the relief valve 50. As illustrated in FIGS. 3 and 4, the base plate 48 is formed with a horizontally-extending bore 59 communicating between the rear end wall and the bore 49 thereof to permit the flow of water under pressure within the chamber provided by the bore 59. To facilitate the coupling or connection therewith of the outer end of the flexible pressure tube 46, the bore 59 has fitted in its outer end portion an outwardly-projecting rigid tube 60. A second tube 61, arranged in horizontally-spaced relation with respect to the tube 60, is secured in a bore 62 in the base plate 48, the inner end of which communicates with a vertically-extending bore 63 communicating with the chamber surrounding the upper end of the relief valve 50.

A pair of machine screws 64 secure one end of a leaf spring 65 against the upper surface of the base plate 48, near its front or narrow end. The leaf spring 65 extends upwardly and rearwardly to terminate in a downwardly-curved outer end portion 66 partially surrounding, in spaced relation, the upper end of the relief valve 50. A hollow, resilient toe pad 67 being formed with a peripheral margin portion 68 hermetically sealed against a peripheral marginal portion of the base plate 48 by means of a plate ring 69 held in place by machine screws 70.

In operation, the faucet attachment member 11 will be screwed upon or otherwise attached to the faucet or other source of water under pressure to be controlled with respect to water flow, as indicated in FIG. 1, and the foot-operated control member 12 will be placed on the floor at a convenient location for foot actuation.

The faucet valve or any other valve in the conduit supply to the attachment member 11 will then be opened so that water under pressure will be applied both to the chamber above the flexible diaphragm 23 defined by the first cylinder bore 19 and the horizontal partition 20 through the bleeder opening 37 in the machine screw 36, and to the annular chamber below said diaphragm defined by the recess 28 through bores 24, annular groove 25 and radial openings 31. Since the area of the diaphragm 23 subjected to the water pressure is greater at the top thereof than at the underside, the diaphragm will normally be urged downwardly into tight seating engagement against the annular valve seat 30 to prevent the flow of fluid through the spout portion 33.

Referring to FIGS. 2 and 3, it will be seen that fluid under pressure applied to the chamber above the diaphragm 23 will also be applied to the underside of the head portion 55 of the relief valve shank member 56 in the foot-operated control member 12. Since the relief valve 50 is normally closed, as described above, the water or fluid pressure above the diaphragm 23 will not be relieved, and the attachment device will normally remain closed, that is, shut off.

When it is desired to start the flow of water or other fluid through the attachment member 11, it is only necessary to depress the resilient toe pad 67 of the foot-operated control member 12, whereupon the outer end portion 66 of the leaf-spring 65 will correspondingly depress the relief valve shank member 56, allowing water under pressure in communication with the chamber above the diaphragm 23 to escape through relief valve 50 into the chamber surrounding the upper end of said relief valve and through bore 62, tube 61, flexible tube 47 and tube 44 to be discharged alongside the spout 33.

Because of the small size of the bleeder opening 37, as long as the valve 50 is held open, the pressure above the diaphragm 23 cannot build up through said bleeder opening fast enough to prevent the normally lesser pressure exerted from the underside thereof from unseating it, thereby permitting water flow over the valve seat 33 and out through the spout 33. By controlling the amount of foot pressure applied to the toe pad 67, the reduction of pressure in the chamber above the diaphragm 23 can be precisely controlled to effect any desired volumetric rate of water flow through the attachment device.

While I have illustrated herein a preferred form of attachment device embodying my invention, it is to be understood that this form is shown by way of example only and not in a limiting sense. In this connection, it is to be understood that while I have described a particular form of foot-actuated valve for use in controlling pressures within the upper diaphragm chamber of the attachment member, the control valve could as well be of any other type capable of controlling fluid flow and adapted to foot actuation. The invention, in brief, comprises all the embodiments and modifications coming within the scope and spirit of the following claims.

What I claim as new and desire to secure by Letters Patent is:

1. An attachment valve device attachable to the spout or discharge opening of a faucet or the like for the flow control of fluid under pressure therein comprising, in combination, an attachment member having inlet and outlet ports, the inlet port including means for attachment in communication with a source of fluid under pressure, the outlet port being tubular in form and providing an annular valve seat within said attachment member, a flexible, circular diaphragm concentrically arranged above said valve seat and normally seated thereagainst for sealing off the flow of water through said outlet port, an upper chamber above said diaphragm subjected to fluid under pressure through a bleeder opening communicating with said inlet port, an annular chamber beneath said diaphragm surrounding said tubular outlet port and communicating with the inlet port, and a foot-operated control member having a normally closed relief valve and flexible conduit means including a first flexible conduit communicating between said relief valve and chamber above said diaphragm for temporarily relieving fluid pressure in said diaphragm chamber, said relief valve being operable to relieve fluid pressure in said flexible conduit and in said upper chamber, the area of said diaphragm at the top thereof subjected to fluid pressure in said upper chamber being greater than the area at the underside of said diaphragm subjected to fluid pressure in said annular chamber, said attachment member comprising a cylindrical body member, an upper end cap member integrally formed with said inlet port, and a lower end cap member integrally formed with said tubular outlet port, said cylindrical body member comprising a horizontal wall portion defining the upper end of said upper chamber, said bleeder opening being in said horizontal wall portion.

2. An attachment device as defined in claim 1 wherein said bleeder opening is in the form of an axial opening in a machine screw received in a tapped through opening in said horizontal wall portion.

3. An attachment device as defined in claim 1 including an annular shoulder formed in said body member at the lower end of said upper chamber, said lower cap member having integrally formed therewith a cylindrical upwardly-extending portion securing a peripheral marginal portion of said diaphragm against said annular shoulder.

4. An attachment device as defined in claim 3 wherein said communication means between said inlet port and said annular chamber comprises a recess in the upper end of said body member, a plurality of vertical bores circularly arranged in radially and circumferentially-spaced relation about said upper chamber and extending vertically into said recess, and a plurality of radially-extending bores communicating one each between the lower ends of said vertical bores and said annular chamber.

References Cited

UNITED STATES PATENTS

| | | | |
|---|---|---|---|
| 916,758 | 3/1909 | Murphy | 251—41 |
| 1,474,472 | 11/1923 | Gulick | 251—45 X |
| 2,216,571 | 10/1940 | Mikalsen | 251—41 X |
| 2,301,581 | 11/1942 | Ray | 251—45 X |
| 2,788,789 | 4/1957 | Asplund | 251—45 X |
| 2,980,385 | 4/1961 | Hunter et al. | 251—46 X |
| 3,245,650 | 2/1966 | Brennan | 251—45 |

FOREIGN PATENTS 279,040    2/1952    Switzerland.

ARNOLD ROSENTHAL, Primary Examiner

U.S. Cl. X.R.

251—45, 295